United States Patent
Choong Cheng Shien et al.

(10) Patent No.: US 9,646,320 B2
(45) Date of Patent: May 9, 2017

(54) SYSTEMS AND METHODS FOR IDENTIFYING CODES THAT MAY BE REDEEMED FOR VALUE

(71) Applicant: Spark Commerce Inc., Wellesley, MA (US)

(72) Inventors: Janssen Choong Cheng Shien, Vancouver (CA); Andrew Moss, Wellesley, MA (US)

(73) Assignee: Spark Commerce, LLC, Fairfax, VA (US)

( * ) Notice: Subject to any disclaimer, the term of this patent is extended or adjusted under 35 U.S.C. 154(b) by 489 days.

(21) Appl. No.: 14/154,381

(22) Filed: Jan. 14, 2014

(65) Prior Publication Data

US 2014/0200977 A1    Jul. 17, 2014

Related U.S. Application Data

(60) Provisional application No. 61/753,617, filed on Jan. 17, 2013.

(51) Int. Cl.
*G06Q 30/00*     (2012.01)
*G06Q 30/02*     (2012.01)

(52) U.S. Cl.
CPC ..... *G06Q 30/0222* (2013.01); *G06Q 30/0239* (2013.01)

(58) Field of Classification Search
None
See application file for complete search history.

(56) References Cited

U.S. PATENT DOCUMENTS

| | | | |
|---|---|---|---|
| 2006/0206376 A1* | 9/2006 | Gibbs | G06Q 30/02 705/14.13 |
| 2007/0001858 A1* | 1/2007 | Bae | H04M 1/72519 340/572.7 |
| 2012/0078755 A1* | 3/2012 | Subbarao | G06Q 30/0641 705/27.1 |
| 2012/0150746 A1* | 6/2012 | Graham | G06Q 30/02 705/50 |
| 2013/0024267 A1* | 1/2013 | Libenson | G06Q 30/02 705/14.38 |
| 2014/0074584 A1* | 3/2014 | Fisher | G06Q 30/0207 705/14.39 |

* cited by examiner

*Primary Examiner* — Richard Reinhardt
(74) *Attorney, Agent, or Firm* — Wolf, Greenfield & Sacks, P.C.

(57) ABSTRACT

Some embodiments of the invention enable users to manage codes which may be redeemed for value. For example, some embodiments provide systems and methods for automatically identifying a code communicated to a user which is redeemable for value, and adding the code to an inventory maintained for the user. When the user later shops at a site which allows a code to be redeemed for value, some embodiments of the invention may automatically detect when the user has navigated to a page on the site which allows redemption of the code, and may make the user aware that the code may be redeemed on the page. If the user opts to redeem the code, the field on the page into which the code is to be input may be automatically identified, and the code may be automatically input into that field.

18 Claims, 7 Drawing Sheets

Spark Commerce: Wallet Plugin

Available $450.00 | Expired sort by: recently added | expiration date | most amount Type 410 ● Promo Code ○ Gift Card Merchant *

Merchant URL *  415

Account *  $ 420

Promo Code # *  405

Expiration Date *  mm ▼ 430  dd ▼ 435  yy ▼  425

Note  440

Cancel   Add  445

Add terms: Pellentesque convallis commodo arcu, sit amet dictum more >
notes: Curabitur adipiscing, velit eu blandit interdum, leo maut more >

Gap Promo Code
available until 2/3/2012
terms: Aliquam vulputate egestas lorem id vulputate.
notes:

$1.41

More share ▼

SYSTEMS AND METHODS FOR IDENTIFYING CODES THAT MAY BE REDEEMED FOR VALUE

RELATED APPLICATION

This application claims priority under 35 U.S.C. §119(e) to U.S. Provisional Patent Application Ser. No. 61/753,617, entitled "METHODS AND APPARATUS FOR AUTOMATED DETECTION & REDEMPTION OF CODE BASED VALUE," filed on Jan. 17, 2013, which is herein incorporated by reference in its entirety.

BACKGROUND OF INVENTION

Some online merchants make available codes which may be redeemed for value. Often, a code may be entered by a user into a field shown on a page on an online merchant's site (e.g., the "shopping cart" or "checkout" page) to be redeemed for value. A user who redeems a code may receive, for example, a reward, a promotional offer, a discount (e.g., of a percentage of their purchase), a gift card (e.g., for later use), free shipping, and/or some other form of value.

Some online merchants make codes available to users for free, to provide an incentive for users to shop at their site instead of other online merchant sites. Other online merchants offer codes for sale to users. For example, group buying sites enable groups of users who each agree to purchase a particular product to buy it at a discount, and often provide a code to each purchaser to redeem to complete the purchase at the specified discount.

A code typically consists of a sequence of letters and/or numbers, although it may include any character type(s), including one or more binary characters. A code may be a unique string (e.g., associated with a particular user), and may be usable once or multiple times (e.g., a code may be usable only once by each of a group of users). A code may have information associated therewith, such as an expiration date for an associated discount or promotional offer, terms, and/or other information.

SUMMARY

Some embodiments of the invention enable users to more easily manage codes which may be redeemed for value. In this respect, some embodiments of the invention provide systems and methods for automatically identifying codes that may be redeemed for value which are provided to a user through any of various modes of communication. For example, some embodiments of the invention may automatically identify codes provided by web pages to which the user navigates, in emails sent to the user, and/or via other communication mechanisms. A code may be automatically identified in any of numerous ways. In one example described herein, a code may be automatically identified by comparing the content of a page, and/or the page's uniform resource locator (URL), to previously stored alphanumeric strings. Other examples include automatically identifying a code based at least in part on the location at which it is placed on a page, and/or based on language context. Once a code is identified, it may be automatically added to an inventory maintained for the user within one or more repositories. When the user later shops at a site which allows a code to be redeemed for value, some embodiments of the invention may automatically detect when the user has navigated to the page on the site at which the code may be redeemed (e.g., the site's "shopping cart" or "checkout" page), make the user aware that he/she has a code in his/her inventory that may be redeemed, and if the user opts to redeem the code, automatically identify the field on the page into which the code is to be input, and input the code there. As such, embodiments of the invention enable the user to seamlessly access the value which a code represents, at the point at which this access is most useful—i.e., when the user is preparing to complete a purchase.

In some embodiments of the invention, a method is provided. The method comprises acts of: (A) identifying, by at least one computer processor, a first sequence of values constituting a first code provided to a first user, the first code being redeemable for value by only the first user; (B) analyzing, by the at least one computer processor, the first sequence of values identified in the act (A) to identify a second sequence of values constituting a second code redeemable for value by a second user; and (C) providing, by the at least one computer processor, the second sequence of values constituting the second code to the second user.

Other embodiments of the invention provide at least one computer-readable storage medium having instructions encoded thereon which, when executed in a computer system, cause the computer system to perform a method. The method comprises acts of: (A) identifying a first sequence of values constituting a first code provided to a first user, the first code being redeemable for value by only the first user; (B) analyzing the first sequence of values identified in the act (A) to identify a second sequence of values constituting a second code redeemable for value by a second user; and (C) providing the second sequence of values constituting the second code to the second user.

Still other embodiments of the invention provide a computer system, comprising at least one computer processor programmed to: identify a first sequence of values constituting a first code provided to a first user, the first code being redeemable for value by only the first user; analyze the identified first sequence of values to identify a second sequence of values constituting a second code redeemable for value by a second user; and provide the second sequence of values constituting the second code to the second user.

The foregoing is a non-limiting summary of some aspects of the invention, certain embodiments of which are defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. Or purposes of clarity, not every component may be labeled in every drawing. In the drawings:

FIG. 4 depicts a representative screen interface which enables a user to identify a code that may be redeemed for value, in accordance with some embodiments of the invention;

FIG. 5 depicts a representative screen interface which enables a user to redeem a code for value, an accordance with some embodiments of the invention;

DETAILED DESCRIPTION OF INVENTION

Some embodiments of the invention provide systems and methods which allow users to more easily manage codes that may be redeemed for value. For example, some embodiments of the invention may automatically identify a code which is provided to a user, such as a code that is emailed to a user, presented on a page to which the user navigates, and/or in any other fashion. Once a code is automatically identified, it may be automatically added to an inventory of codes maintained for the user in one or more repositories. Later, when the user is shopping online, some embodiments of the invention may automatically detect when the user has navigated to a page at which a code may be redeemed, and alert the user that he/she has a code in his/her inventory that may be redeemed for value. If the user opts to redeem the code, some embodiments of the invention may automatically identify the field on the page into which the code is to be input, and automatically input the code into the identified field. As such, some embodiments of the invention enable a user to seamlessly unlock the value which a code represents, at the point in the shopping experience at which access is most useful.

Figure 1:
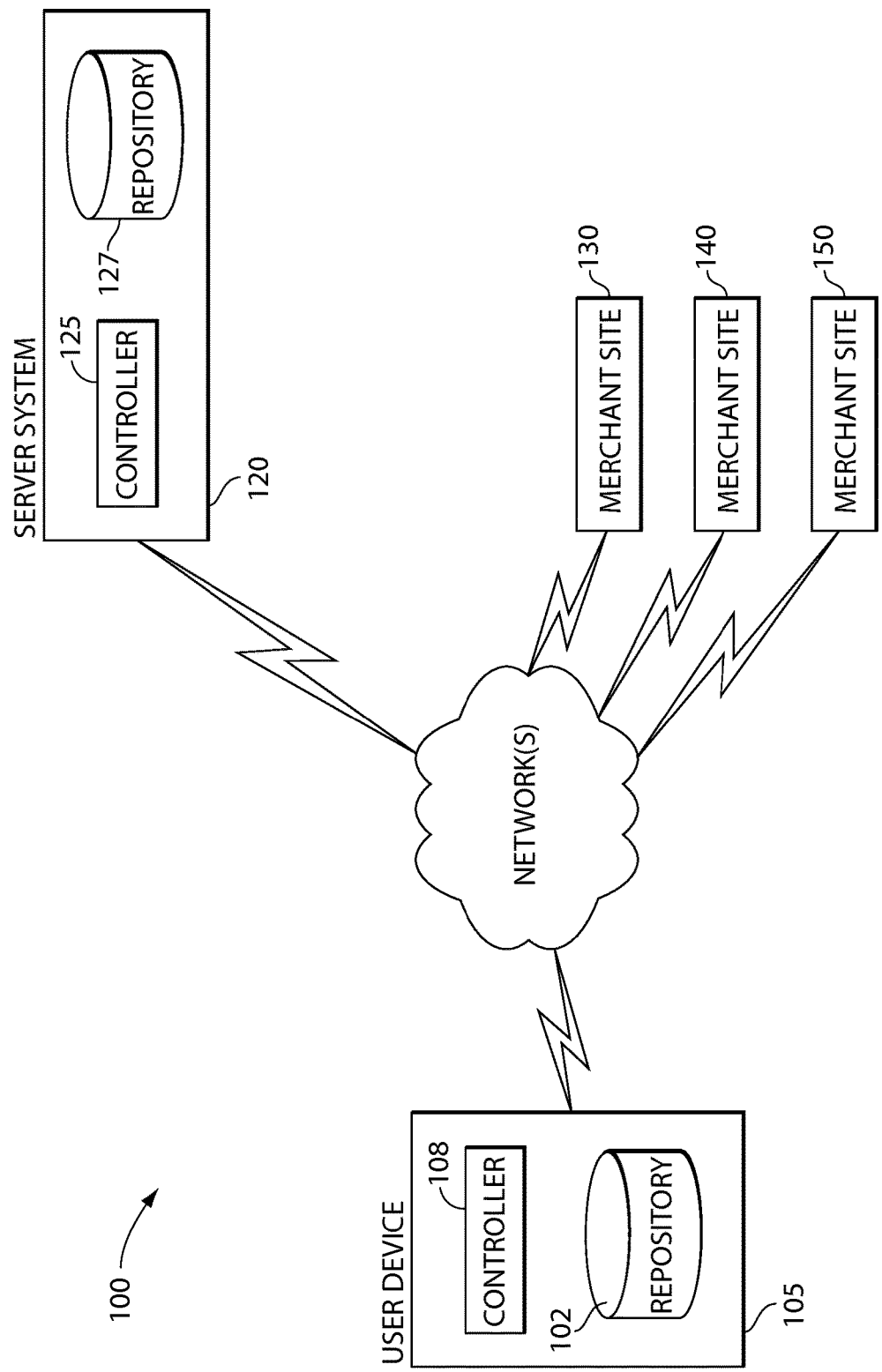
FIG. 1. is a block diagram depicting a representative system comprising components enabling redemption of a code for value, in accordance with some embodiments of the invention.

FIG. 1 depicts a representative system 100 that enables a user to manage and redeem codes for value. System 100 includes user device 105, which comprises controller 108 and repository 102. User device 105 communicates via network (s) 110 with server system 120, which comprises controller 125 and repository 127. User device 105 may comprise any computing device suitably configured to communicate over network (s) 110 with server system 120. For example, user device 105 may comprise a desktop or laptop personal computer, a mobile device (e.g. a "smartphone" or tablet device designed for mobile use), a television, a gaming console, and/or any other suitable device(s). Similarly, server system 120 may comprise any suitable collection of hardware and/or software components. Embodiments of the invention are not limited to any particular mode of implementation. Communication over network(s) 110 may be accomplished using any suitable communications infrastructure and/or protocol(s), as embodiments of the invention are not limited in this respect.

Controller 108, executing on user device 105, and/or controller 125, executing on server system 120, may implement functionality described in further detail below relating to the automatic identification and/or redemption of codes. Controllers 108 and 125 may each be implemented in any of numerous ways, such as with dedicated hardware, or using a processor (e.g., a microprocessor) programmed (e.g., using software, microcode, and/or any other type(s) of computer code that can be employed to program a processor to provide functionality) to implement aspects of the invention described herein. For example, in some embodiments of the invention, controllers 108 and 125 may include software executed by processors (not shown in FIG. 1) resident on user device 105 and server system 120, respectively. This software may be standalone in nature, or may execute in conjunction with other software. For example, controller 108 on user device 105 may comprise software which executes in conjunction with a browser application executing on user device 105, such as a "plug-in" to such a browser application, as is known in the computer programming arts. However, the invention is not limited to such an implementation. It should be appreciated as well that the ability to provide the functionality described herein may be distributed, logically and/or physically, in any suitable fashion between controller 108 and controller 125.

Repositories 102 and 127, on user device 105 and server system 120, respectively, may store codes identified during execution of controllers 108 and/or 125 (as well as other information). For example, a code which is automatically identified (e.g., as a user navigates to an online merchant site) may be stored in repository 102, in repository 127, in both repositories, and/or partially in repository 102 and partially in repository 127. Any of numerous modes of storage may be envisioned, and the invention is not limited to any particular mode of implementation. Repositories 102 and 127 may each be implemented in any of numerous ways. For example, repository 102 on user device 105 may comprise one or more "cookies," as are known in the art, local storage (e.g., as defined by an application executing on user device 105 (e.g., a browser application), or defined in some other manner) and/or some other form(s) of storage facility.

User device 105 communicates via network (s) 110 with merchant sites 130-150. Communication may take any suitable form. For example, as noted above, in some embodiments user device 105 may execute a browser application that enables a user to navigate to merchant sites. It should be appreciated, however, that embodiments of the invention are not limited to use with web sites accessible via a browser. As such, merchant sites 130-150 may each comprise any "site" which is accessible via the Internet. In this respect, any one or more of merchant sites 130-150 may not be a web site per se, but rather may comprise a "mobile version" of a site, or another form of site to which a user may navigate online. For example, a user may navigate to one or more of merchant sites 130-150 by inputting a uniform resource locator (URL) into a browser application, by clicking on a link, by being automatically taken there via an action initiated by another site and/or another application program, and/or in any other suitable fashion.

Merchant sites 130-150 may each make available codes that may be redeemed for value, and/or enable a user to redeem a code for value. For example, user device 105 may obtain a code from merchant site 130, and then redeem the code for value at merchant site 140. In another example, user device 105 may obtain a code from merchant site 130, and redeem that code on merchant site 130 as well. Codes may be obtained and/or redeemed from any suitable merchant site(s), as embodiments of the invention are not limited in this respect.

Figure 2:
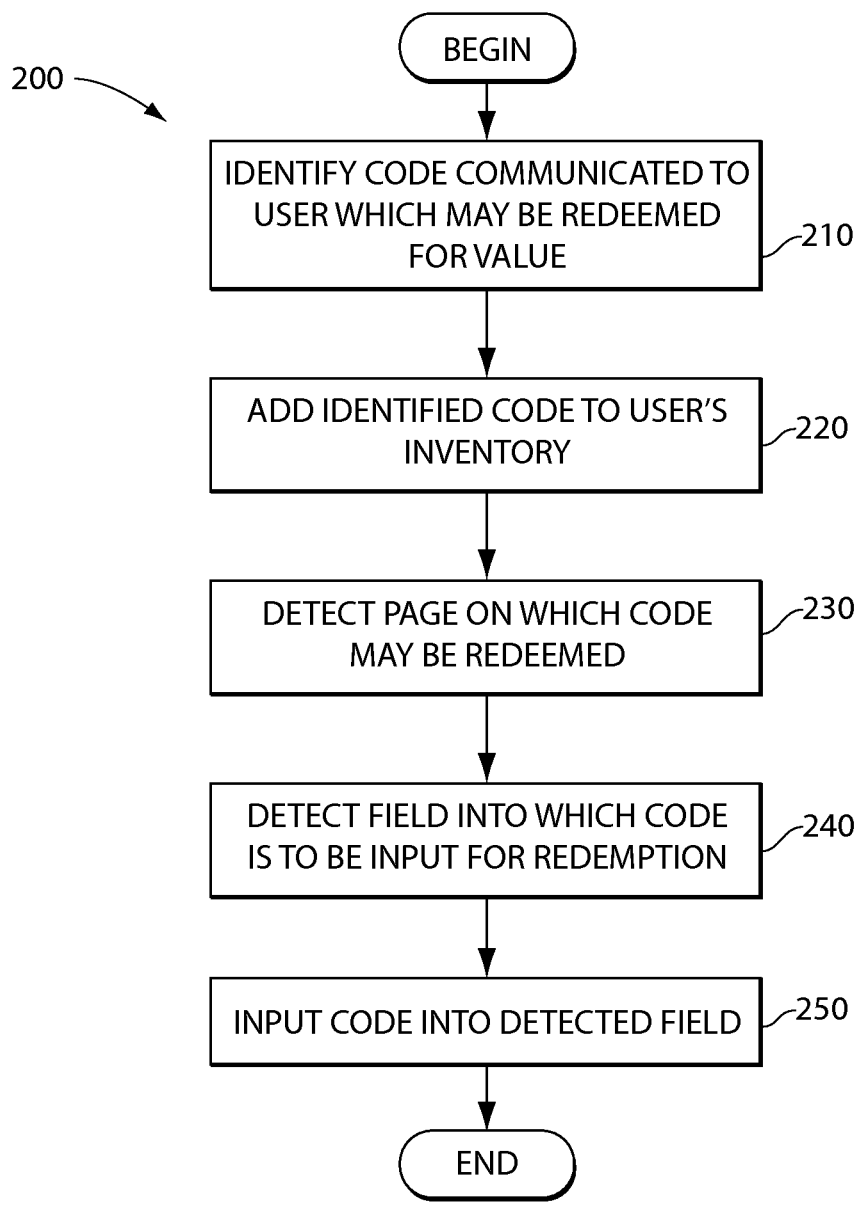
FIG. 2. Is a flowchart depicting a representative process for enabling redemption of a code for value, in accordance with some embodiments of the invention.

FIG. 2 depicts a representative process 200 which may be performed by one or more components of representative system 100 to a code to be redeemed for value. At the start of representative process 200, a code which has been communicated to a user and which may be redeemed for value is identified in act 210. This may be performed in any of numerous ways. In some embodiments of the invention, a user may identify a code that may be redeemed for value by clicking on a link, image, active area, and/or some other object on a page which has been communicated to the user. The page may, for example, be provided by one of merchant sites 130-150, be presented by a web site that provides an email service (e.g., the page may comprise an email message accessible via a browser application), be presented by an application that provides an email service, be presented by an online store that is accessed by a standalone application which is not a browser application, and/or be any other suitable form of page.

In some embodiments of the invention, a code is not identified by a user, but rather is automatically identified. For example, act 210 may involve controller 108 and/or controller 125 automatically identifying a code, such as a code provided on a page. Automatic identification of a code may take any of numerous forms. In some embodiments, a controller may scan the page(s) of a merchant site to which a user navigates, searching for characteristics which signal the presence of a code. Any of numerous types of page characteristics may indicate the presence of a code. For example, controller 108 and/or controller 125 may compare a page's content, URL (or portions thereof), markup language tags, and/or any other suitable data to information which was previously identified as indicating the presence of a code. For example, controller 108 and/or controller 125 may compare the content of a page to alphanumeric strings previously stored in repository 102 and/or repository 127 to determine whether a code is present on the page. The string(s) may, for example, vary from one page operator (e.g., merchant site, email provider, etc.) to another, so that the strings to which page information is compared when a user has navigated to a page provided by a first page operator may differ from the strings to which page information is compared when a user has navigated to another page provided by a second page operator.

Automatic identification of a code may, for example, be based at least in part on the location at which a code is placed on a page. For example, the location of an alphanumeric string at the top right of a page, or a certain number of measurement units (e.g., pixels) below the top of a page, below the top portion of a page displayed by a browser application, below the top of the screen, from the right of the page, from the right of the portion of a page displayed by a browser application, and/or from the right of the screen, may indicate that the alphanumeric string is a code which may be redeemed for value. Any suitable position information may be used to identify a code. Further, a position which indicates that a string is a code may vary from page to page, or from page operator to page operator. For example, the location of an alphanumeric string near the top right of a page provided by one page operator may indicate that the string is a code which may be redeemed for value, but placement of a string at the same location on another page provided by another page operator may not indicate that the string is a code.

A code may also be automatically identified based at least in part on language context. For example, if a page includes language such as "Please save this code: xxxxxx", then controller 108 and/or controller 125 may determine that the "xxxxxx" is a code which may be redeemed for value.

A code may also be automatically identified based at least in part on a comparison between alphanumeric strings contained in a page with codes previously retrieved, such as codes previously retrieved by users other than the user who operates device 105. Such previously retrieved codes may, for example, be stored in one or more of repositories 102 and 127, and retrieved by controller 108 and/or controller 125 for comparison with page content to which a user navigates.

A code may also be automatically identified based at least in part on page information which identifies certain content as a code that may be redeemed for value. For example, a markup language (e.g., HTML, XML, etc.) tag may identify tagged content as a code that may be redeemed for value. In addition, information contained in a page's URL may identify it as one which includes a code that may be redeemed for value. For example, if a page's URL includes the word "code," then this may indicate that the page includes a code that may be redeemed for value.

A code may be automatically identified based at least in part on information gathered by or from other users who have previously accessed a particular site. Any of numerous types of information may be gleaned from other users' previous visits to a site. For example, the presence of a code on a particular page, a code's location on a page, the code itself (e.g., if the code is not unique to individual users), and/or other information may be captured and used to automatically identify a code.

A code which may be redeemed for value by one user may be identified by analyzing codes provided to other users. In this respect, the inventors have recognized that some codes are fixed-length alphanumeric strings comprising a sequence of values specific to an individual user, and that some of the values in the sequence are dynamically defined based on data on the user to which the code is provided. As an example, in a given code for a particular user, the values in digits four through seven of the code may be an encoded representation of the user's address, the values in digits twelve through fifteen may be an encoded representation of the user's name, etc. As such, identifying the code that one user may redeem for value may involve analyzing the sequences of values constituting codes which were previously provided to, and/or successfully redeemed by, other users.

Figure 3:
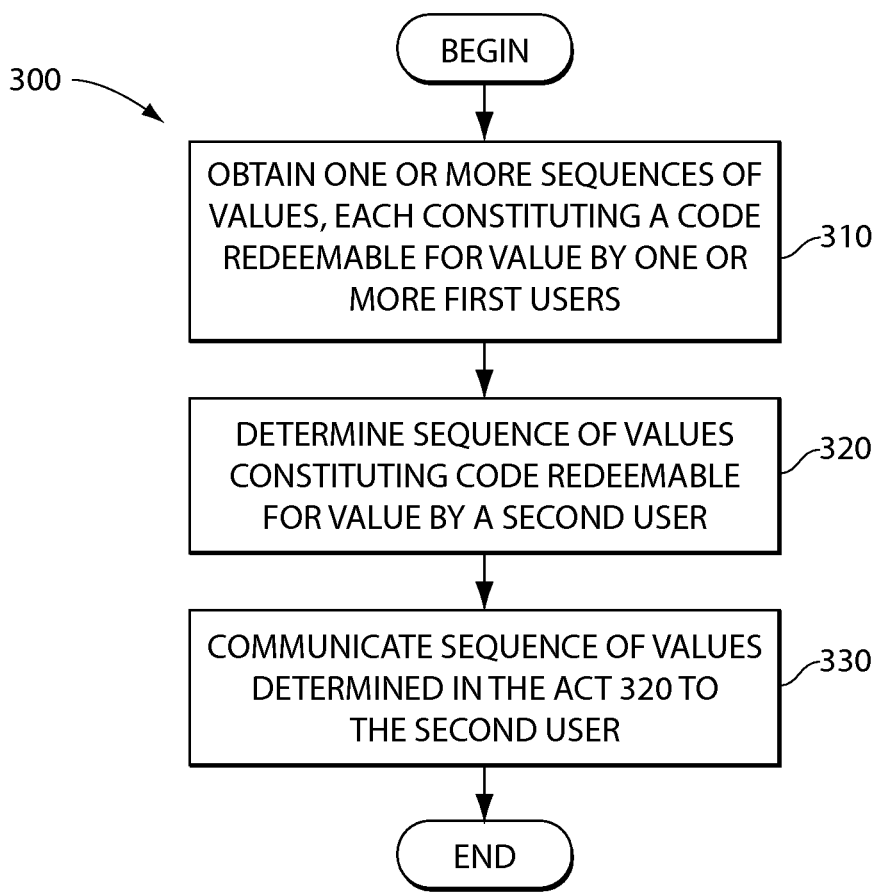
FIG. 3 is a flowchart depicting a representative process for identifying a code that may be redeemed for value by one user based on a code provided to another user, in accordance with some embodiments of the invention.

FIG. 3 depicts a representative process 300 for identifying a code that may be redeemed for value by one user based on an analysis of codes provided to one or more other users. At the start of representative process 300, one or more sequence of values, each constituting a code redeemable by one or more first users, is (are) obtained. The sequence(s) of values may be obtained in any of various ways. For example, in some embodiments of the invention, codes redeemed for value on a particular site or page by the one or more first users may be recognized by controller 108 and/or controller 125, and stored in repository 102 and/or repository 127.

Process 300 then proceeds to act 320, wherein a sequence of values constituting a code that may be redeemed for value by a second user is determined, based on an analysis of the code(s) obtained in the act 310. This, too, may be performed in any of numerous ways. In some embodiments of the invention, controller 108 and/or controller 125 may compare the sequences of values obtained in the act 310 to corresponding data relating to users in the first group. Through such analysis, embodiments of the invention may identify the format of a code (e.g., the digits in which encoded representations of certain data are placed, and how the representations are encoded). For example, pattern recognition techniques may be employed to recognize that certain digits (which may or may not be contiguous) within a sequence are associated with a user's address data, that the address data is represented (e.g., encoded) in a particular manner in the sequence. Using this information, some embodiments of the invention may determine the manner in which a second user's address information would be represented in a code for that user.

Any suitable number of data elements represented in a sequence of values constituting a code may be recognized, and each element may be represented in a different manner. For example, the act 320 may involve recognizing that in a given sequence of values a first data element is encoded in a first manner, and a second data element is encoded in a second manner.

Any suitable technique(s) may be employed to analyze the codes obtained in the act 310 identify the format of a code, and thereby identify a code that may be redeemed for value by a second user in the act 320. For example, multiple pattern recognition techniques may be employed to discern the manner format and/or content of a code.

Representative process 300 then proceeds to act 330, wherein the sequence determined in the act 320 is communicated to the second user. This, also, may be performed in any of various ways. For example, in some embodiments of the invention, controller 108 executing on user device 105 may cause the sequence to be presented to the second user on a page to which the user navigates. However, it should be appreciated that any suitable technique(s) may be employed, such as electronically communicating the sequence of values constituting the code to the second user via email, text message, and/or some other communication mechanism.

At the completion of the act 330, process 300 completes.

A code may be automatically identified based at least in part on information provided by a user. In one example, a user may indicate the presence of a code through certain types of input (e.g., through a "right click" of a mouse). Controller 108 and/or controller 125 may respond to such types of input by prompting the user to indicate whether a code has been identified. If so, controller 108 and/or controller 125 may store the identified code in repository 102 and/or repository 127.

A user may also manually specify a code, such as through typewritten or spoken input. FIG. 4 depicts a representative screen interface 400 which enables a user to supply input identifying a code that may be redeemed for value. Screen interface 400 may be displayed, for example, as part of a screen interface presented by a browser application while a user views a page. Screen interface 400 includes field 405, which allows a user to identify a code, field 410, which allows the user to identify a merchant, field 415, which allows the user to identify a URL for a site, field 420, which allows the user to identify an amount for which the code may be redeemed, and fields 425, 430 and 435, which allow the user to identify an expiration date for the code. Field 440 allows the user to specify a note to be associated with the code, and button 445 allows the user to add the identified code to a repository (e.g., repository 102 on user device 105 and/or repository 127 on server system 120).

It should be appreciated that the techniques listed above for identifying a code are merely representative, and that other techniques may be used. It should also be appreciated that a code may be identified using a combination of techniques. For example, identification of a code may involve a combination of automated techniques, of automated and manual techniques, or of manual techniques. A code may be identified in any suitable manner, as embodiments of the invention are not limited in this respect.

It should further be appreciated that functionality enabling the automatic identification of codes that may be redeemed for value may be incredibly useful to users. As one example, as noted above, codes may be automatically identified from emails which are sent to a user. The inventors have appreciated that many users delete at least some of the emails sent to him/her without reading or inspecting them closely. However, those users may not delete certain emails if they knew that they included codes which may be redeemed for value. As such, some embodiments of the invention enable a user to reap the value that codes communicated to them via email represent, without having to expend the time and energy to read all of the emails which may contain those codes.

Referring again to FIG. 2, at the completion of act 210, an identified code is added to the user's inventory. For example, an identified code may be stored by controller 108 on user device 105 in repository 102, and/or by controller 125 on server system 120 in repository 127. The code which is stored in the act 220 may be added to previously stored codes (e.g., codes that the user of device 105 has previously saved, codes which were loaded to repository 102 by controller 108 and/or controller 125 based on other users' activities, etc.). Repository 102 on user device 105 and repository 127 on server system may each take any of numerous forms. For example, repository 102 may comprise one or more cookies, local storage (e.g. on the hard drive directly, or as defined by the browser) and/or any other suitable form(s) of storage. Embodiments of the invention are not limited in this respect.

Representative process 200 then proceeds to act 230, wherein a page on which the code may be redeemed is detected. This may be performed in any of numerous ways. In some embodiments of the invention, when a user of device 105 navigates to a particular page on a merchant site, controller 108 and/or controller 125 compare(s) the page's URL to URLs of pages on which other codes were previously redeemed (e.g., the URLs of checkout pages on various merchant sites, which may be stored in repository 102 and/or repository 127). If the URL for the page to which the user is navigated matches the URL for a page on which one or more codes were previously redeemed (e.g., if the user has navigated to a site's checkout page), then it is determined that the page is one which enables the code to be redeemed.

The inventors have appreciated that some merchant sites employ dynamic URLs which include components (e.g., parameters identifying the user, a processing thread, etc.) that may change from user visit to user visit. As such, some embodiments of the invention provide for comparing one or more components, or portions, of the URL of a page to which the user has navigated to corresponding portions of other URLs. For example, some embodiments provide for comparing one or more "base" components of a URL (e.g., components nearer to the left-hand side of the character string constituting the URL than to the right-hand side) to corresponding components of other URLs to determine whether a page to which the user has navigated will enable a code to be redeemed.

It should be appreciated that some embodiments of the invention are not limited to determining whether a page to which a user has navigated is one which enables a code to be redeemed based on its URL. For example, some embodiments may detect whether a code may be redeemed on a page by analyzing other characteristics of the page, such as the presence of one or more character strings on the page (e.g., strings identifying the page as a checkout page). Any suitable technique may be employed, as embodiments of the invention but are not limited in this respect.

Representative process 200 then proceeds to act 240, wherein a field provided on the page detected in the act 230, into which the code may be input for redemption, is identified. (In this respect, it should be appreciated that the term "field" is used herein to denote any area within the page detected in the act 230 that is used to capture input data.) This, too, may be performed in any of various ways. In some embodiments, a field into which a code may be input may be identified based at least in part on characteristics which indicate its location on the page. As an example, a field may be identified based on its markup language tag or name, based on it being located at a particular position on the page, and/or based on any of numerous other identifying characteristics.

In some embodiments, the identifying characteristics of the field may be detected manually (e.g. by an operator) and stored as information (e.g. in one or more of repositories 102 and 127) which may be accessed by controller 108 and/or controller 125 during operation. For example, an operator may examine the shopping cart and/or checkout pages of multiple online merchants, and record one or more identifying characteristics of fields on the pages in repository 102 and/or 127. Then, when it is determined in the act 230 that a user has navigated to a page on which a code may be redeemed, controller 108 and/or controller 125 may retrieve these characteristics from storage for use in identifying the field into which a code may be input for redemption.

Of course, the identifying characteristics of fields into which a code may be input need not be manually recorded. In some embodiments of the invention, input operations performed by multiple users may be analyzed to detect the identifying characteristics of a field into which a code may be entered. As one example, some embodiments may monitor copy and paste operations performed by users to insert information into a particular field on a page, and if the number of copy and paste operations reaches a predetermined threshold, a conclusion is drawn that the field is the one into which a code is entered. As such, identifying characteristics of the field (e.g., its location on the page, a markup language tag identifying it, etc.) may be recorded in repository 102 and/or repository 127, and accessed by controller 108 and/or controller 125 to identify the field when a user navigates to the page.

In some embodiments of the invention, the detection of a field into which a code may be input in act 240 triggers a visual display to the user of information on one or more codes which may be entered. Representative screen interface 500, shown in FIG. 5, may be displayed upon detection of a field in the act 240 to provide information on codes which the user may enter into the field. This information may, for example, be retrieved from repository 102 on user device 105 and/or repository 127 on server system 120. The information may relate to codes which are generic to multiple users, which are unique to the user of device 105, which are derived from codes issued to other users, and/or which comprise any other codes available to the user.

In representative screen interface 500, two display areas 501 and 502 indicate to the user that there are two codes available for use. In the example shown, display area 501 indicates to the user that he/she may use a "gift card" code having $150.00 in value, and display area 502 indicates to the user that he/she may use a "promo" code having $3.04 in value. Display area 501 includes button 505, which allows the user to redeem the "gift card" code, and display area 502 includes button 510, which allows the user to redeem the "promo" code. Clicking button 505 or 510 may, for example, cause the corresponding "gift card" or "promo" code to be automatically entered into the field detected in the act 230.

It should be appreciated that a screen interface providing information on codes available to the user may not be shown immediately upon a field being detected in the act 230. For example, in some embodiments of the invention, a screen interface like that which is shown in FIG. 5 may be shown when a user "hovers" a cursor over a detected field, when the user selects the field for entry of data, or in response to any other suitable form of user input.

Figure 5:
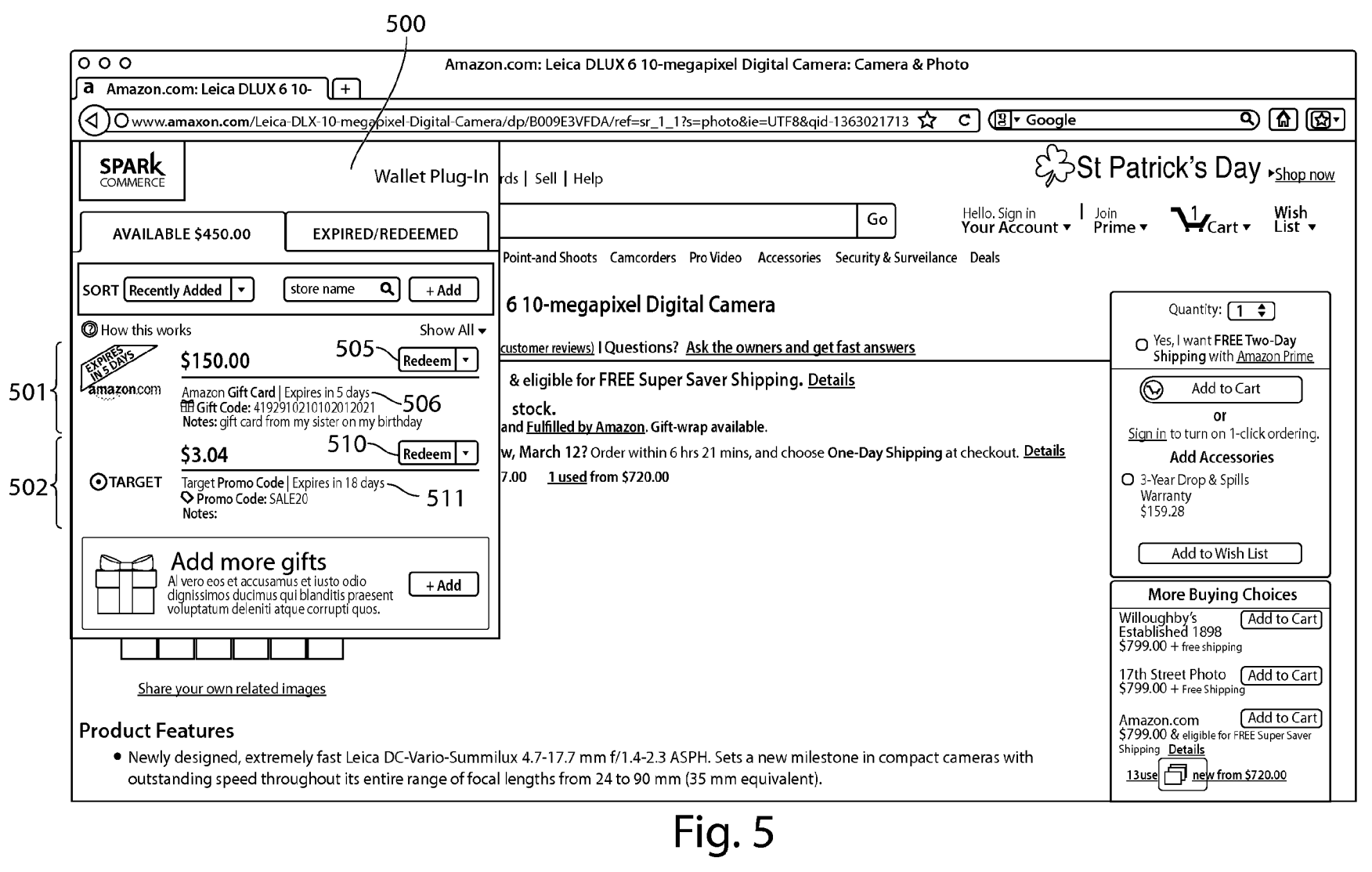

It should also be appreciated that a screen interface like that which is shown in FIG. 5 may show information on any suitable number and type of codes. For example, in some embodiments, if the user has navigated to a page affiliated with a particular online merchant (as detected in the act 230), then only codes which are accepted by that merchant may be shown to the user. Using FIG. 1 to illustrate, if the user has navigated to a page on merchant site 130, then a screen interface may only show information on codes which are accepted by merchant site 130, and not on codes that are only accepted by merchant site 140 or merchant site 150. Of course, embodiments of the invention are not limited to such an implementation.

Display areas 501 and 502 of screen interface 500 also show expiration information for corresponding codes. Specifically, display area 501 shows that the corresponding "gift card" code expires in five days at 506, and display area 502 shows that the corresponding "promo" code expires in eighteen days at 511. In this respect, the inventors have appreciated that providing users information on when codes will expire (e.g., no longer be redeemable for value) may assist users in managing their codes. For example, if a user has multiple codes in his/her inventory that may be redeemed, but one of those codes is about to expire, the user may be more likely to use that code (e.g., to pay for part of a purchase) than another code which is not set to expire so soon.

Screen interface 500 need not be used to provide a user expiration information, as such information may be communicated in any of various ways. For example, an electronic message (e.g., an email, text message, and/or other form of electronic communication) may be used to communicate expiration information on a code to a user. For example, an email could be sent to remind a user that he/she has a code in inventory which is about to expire in a few days. Another potential manner of providing expiration information on a code is in response to the user performing a search. For example, if a user performs an online search for a particular type of goods or services, controller 108 and/or controller 125 may cause a reminder to be shown to the user about a code in his/her inventory that may be redeemed for a discount on the goods or services.

As part of providing expiration information on a code, some embodiments of the invention may prompt the user to take action with respect to the code. For example, some embodiments of the invention may, when reminding the user about a code which is set to expire shortly, prompt the user to "gift" the code if he/she is not going to use it. Gifting a code may be accomplished in any of various ways. For example, a user's indication that a code should be gifted to another person (identified, by example, by email address) may cause controller 108 and/or controller 125 to communicate the code (e.g., via email) to the other person and inform the other person that the code is about to expire.

Some embodiments of the invention may provide expiration information on codes to parties other than users. As one example, in some embodiments, information on codes which are set to expire soon, and the users that hold those codes in their inventories, may be provided to online merchants so that they may encourage the users to use the codes before they expire. For example, online merchant 130 may communicate an offer to a user who holds a code in her inventory that can be redeemed for a ten percent discount on any purchase, offering to double the discount if the user redeems the code before its expiration.

Some embodiments of the invention may also provide expiration information on codes to operators of deal aggregator sites that make codes offered by multiple online merchants available to users. In this respect, to date, these deal aggregator sites have not been able to track which users have obtained codes for use, redeemed codes, obtained codes but allowed them to expire unused, etc. Some embodiments of the invention may provide information on codes which have been obtained, been redeemed, and/or expired to deal aggregator sites, allowing these entities more visibility into how the codes they make available to users are redeemed at different online merchants.

Referring again to FIG. 2, at the completion of the act 240, process 200 proceeds to act 250, wherein one or more codes are input into the field detected in the act 240. This, also, may be performed in any of numerous ways. In some embodiments of the invention, the code(s) may be automatically entered into the detected field. For example, in embodiments of the invention which employ screen interfaces like that shown in FIG. 5, the user's selection of a code (e.g., using buttons 505 or 510) may cause the corresponding code to be automatically entered into the detected field.

In other embodiments, controller 108 and/or controller 125 may retrieve the code(s) from repository 102 and/or repository 127 and automatically enter the code(s) into the detected field. For example, an inventory of codes may be maintained for the user in repository 102 and/or repository 127, and the code(s) may be selected from the inventory for entry into the field. The code(s) may be selected using any suitable criteria. For example, in some embodiments, only the code(s) which are accepted by the online merchant that makes available the page detected in the act 230 may be retrieved from the user's inventory. In other embodiments, if multiple codes in the user's inventory are acceptable by the online merchant in question, but only one code may be used in a particular transaction, then the code with the highest associated value may be retrieved from the user's inventory for use.

The automatic input of one or more codes into a field may also be initiated by a merchant site. For example, in some embodiments, a merchant site may provide functionality which initiates code retrieval, such as by providing a button or link which a user may select (e.g., "click") to retrieve one or more codes from an inventory maintained in repository 102 and/or repository 127.

Of course, the entry of one or more codes into a field need not be automated. For example, a user may type a particular code into the detected field, or initiate manual retrieval of the code(s) from inventory. Any suitable technique(s) may be employed, as embodiments of the invention are not limited in this respect.

It should be appreciated that, like the identification of a code in the act 210, the input of one or more codes into a field may be accomplished using a combination of techniques, including automatic and/or manual techniques, including automatic and/or manual techniques not specifically described herein. Embodiments of the invention are not limited to any particular mode of implementation.

At the completion of the act 250, process 200 completes.

It should be appreciated that many variations on the representative process 200 described above are possible. For example, some embodiments of the invention may employ variations on process 200 which include acts other than the acts 210-250 described above, some may not include all of acts 210-250, and some may include acts 210-250 (or a subset thereof) performed in a different order than that which is described above. The various embodiments of the invention are not limited to enabling users to manage codes that may be redeemed for value in any particular way.

Figure 6:
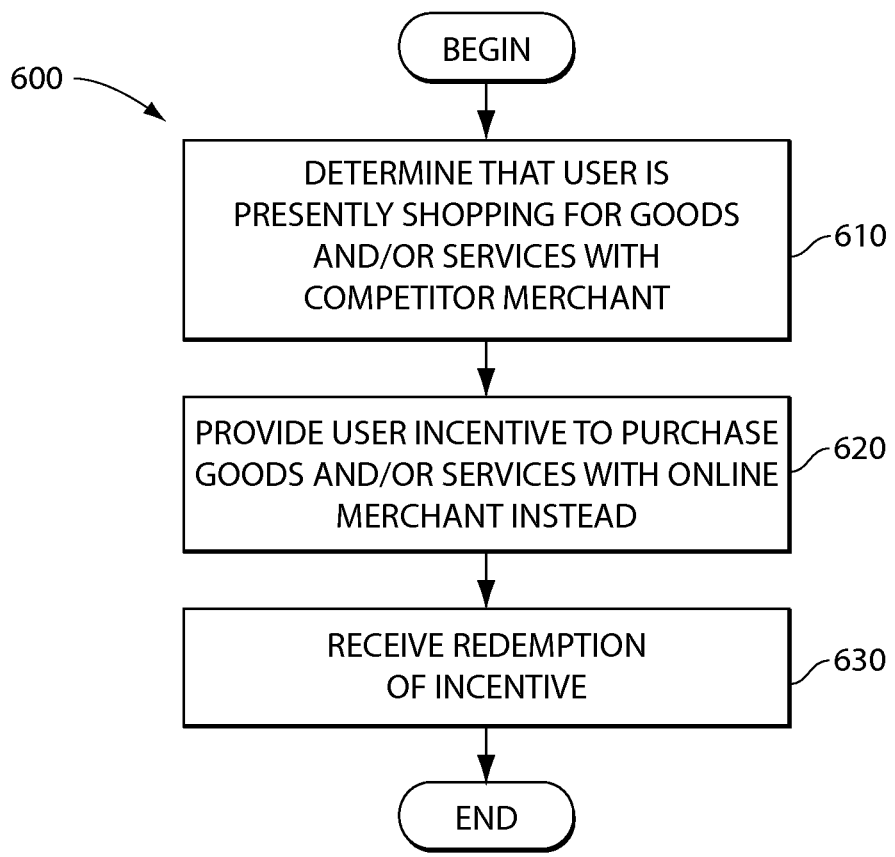
FIG. 6 is a flowchart depicting a representative process for encouraging a user to shop at an online merchant's site, in accordance with some embodiments of the invention.

Some embodiments of the invention enable an online merchant to encourage a user to complete a purchase at its site rather than with another online or offline merchant. For example, a particular online merchant that offers a certain type of goods for sale on its site may detect that a user is shopping for goods of that type at either an offline merchant's location, or another online merchant's site, and communicate a code to the user that may be redeemed for value (e.g., a discount from the offline merchant's or other online merchant's price), thereby providing an incentive for the user to purchase the goods at its site instead. Representative process 600, shown in FIG. 6, may be performed by an online merchant to encourage users to complete purchases at its site rather than at other sites.

At the start of representative process 600, a determination is made in the act 610 that a user is presently shopping for goods and/or services with another merchant. As noted above, the other merchant may be an offline merchant (such that the user may be shopping in a "bricks and mortar" store) or another online merchant. Detection that a user is shopping at an offline merchant's location may be performed in any of numerous ways. In some embodiments of the invention, a comparison of location information provided by a device operated by the user (e.g., global positioning system (GPS) information, provided, for example, by user device 105) to location information corresponding to stores operated by the offline merchant may indicate that the user is presently located at one of the offline merchant's stores. Any suitable information may be used to detect that a user is presently shopping at an offline merchant.

Detection that a user is shopping at another online merchant's site may also be performed in any of various ways. In some embodiments, controller 108 and/or controller 125 may be configured to monitor the pages to which a user navigates, and to compare the URLs of the pages, or portions thereof, to URLs or URL portions of pages offered by competitors, to detect when the user is presently shopping at a competitor's site. Of course, embodiments of the invention are not limited to detecting when a user is shopping with another online merchant by comparing URL information. For example, some embodiments may analyze the content of pages to which a user navigates, examine social media activity, and/or utilize any other suitable information to determine that a user is shopping at another online merchant's site.

In act 620, the user is presented an incentive to purchase goods and/or services from the online merchant performing process 600, instead of from the offline merchant or competitor online merchant. This, also, may be performed in any of numerous ways. If it is determined in the act 610 that the user is presently shopping at an offline merchant's store, then presentation of an incentive may comprise communicating a code that may be redeemed for value to a mobile device operated by the user. The code may be communicated in any suitable manner, such as by text message, by email, via an "alert" presented by an application (e.g., "app") executing on a device operated by the user, and/or using any other suitable technique(s). If it is determined in the act 610 that the user is presently shopping at a competitor online merchant, then presentation of an incentive may include communicating a code to the device presently being employed by the user to shop (e.g., a computer, mobile device, television, game console, and/or any other suitable device(s)), using any suitable mode(s) of communication. The code may, for example, be communicated in a manner designed to capture the user's immediate attention, so that the user has an opportunity to consider the communicated incentive before completing a purchase with the offline merchant or competitor online merchant.

Any suitable incentive may be offered to a user. For example, a code presented to a user may be redeemed for a discount, free shipping, a promotional offer, and/or any other form(s) of value.

Process 600 then proceeds to act 630, wherein the user's redemption of the incentive is received. In some embodiments of the invention, techniques like those described above with reference to FIG. 2 may be performed, for example, to automatically add the communicated code to an inventory of codes maintained for the user, to detect a page on which the code may be redeemed, to detect a field into which the code is to be input, and/or to automatically enter the code into a detected field. Any suitable technique(s) may be employed to receive a user's redemption of an incentive.

At the completion of the act 630, process 600 completes.

Figure 7:
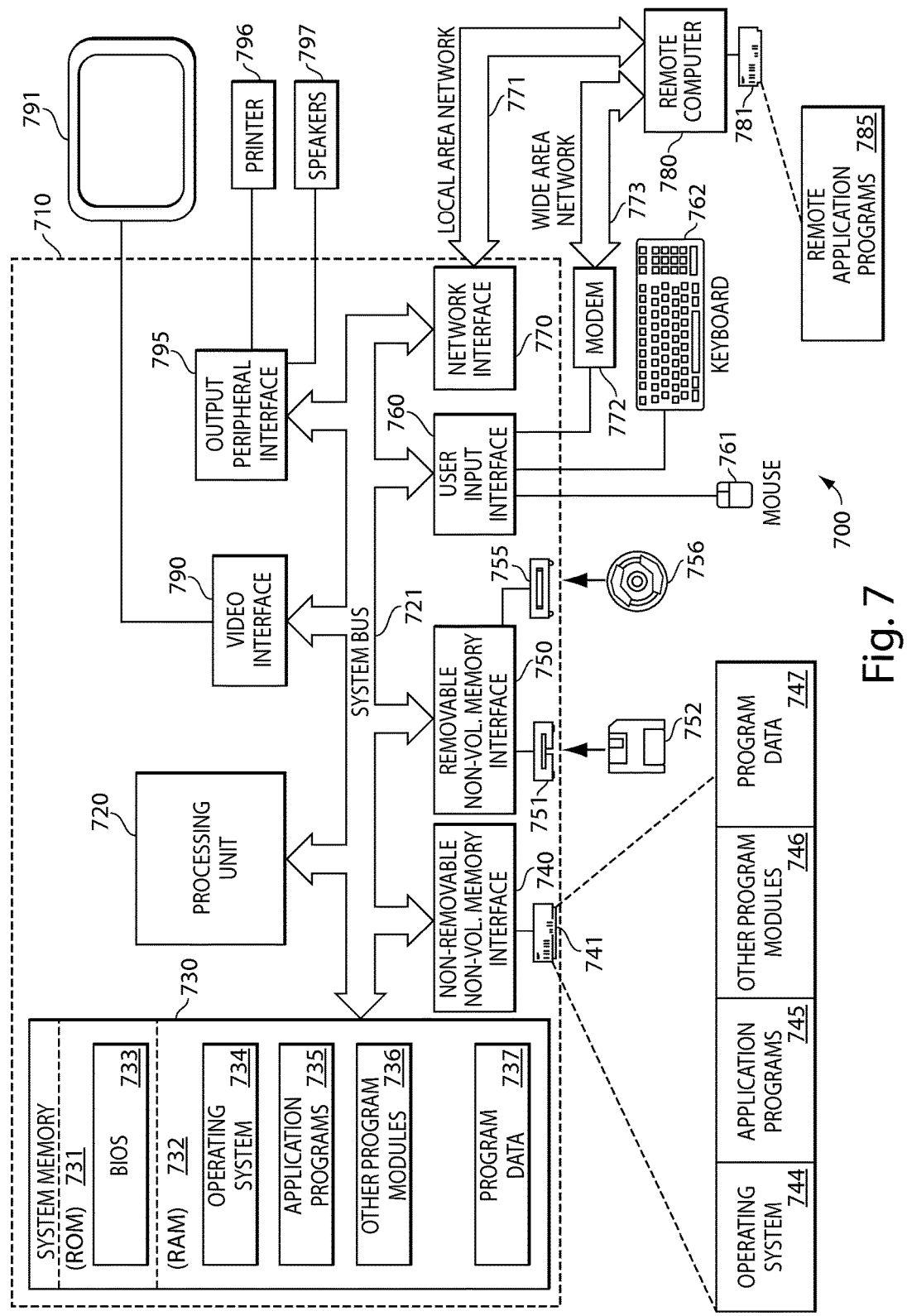
FIG. 7 is a block diagram depicting a representative computer system that may be used to implement various aspects of the invention.

FIG. 7 illustrates one example of a suitable computing system environment 700 which may be used to implement aspects of the invention. The computing system environment 700 is only one example of a suitable computing environment, and is not intended to suggest any limitation as to the scope of use or functionality of the invention. Neither should the computing environment 700 be interpreted as having any dependency or requirement relating to any one or combination of components illustrated in the exemplary operating environment 700. In this respect, the invention is operational with numerous other general purpose or special purpose computing system environments or configurations. Examples of well-known computing systems, environments, and/or configurations that may be suitable for use with the invention include, but are not limited to, personal computers, server computers, mobile or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 7 depicts a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 710. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 536, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 560 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium, such as a transitory medium like a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been provided. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising acts of:
(A) automatically identifying, by at least one computer processor, a first sequence of values constituting a first code provided to a first user on a first web page being viewed by the first user, the first code being redeemable for value by only the first user, the identifying being based at least in part on an analysis of the first web page and information gathered from previous visits by one or more other users to one or more web pages on which codes were provided;
(B) dynamically reformulating, by the at least one computer processor, at least some of the values in the first sequence of values automatically identified in the act (A) to produce a second sequence of values, different than the first sequence of values, constituting a second code redeemable for value by a second user;
(C) automatically adding, by the at least one computer processor, the second sequence of values constituting the second code to an inventory of codes associated with the second user; and
(D) in response to the second user navigating to a second web page, automatically determining, by the at least one computer processor, that the second web page enables redemption of the second code for value, and causing the second code to be input to a field on the second web page, the second web page being accessible via the Internet, the determining being based at least in part on information gathered from previous visits by one or more other users to one or more pages on which codes were redeemed.

2. The method of claim 1, wherein the act (B) comprises:
the at least one computer processor identifying in the first sequence of values an encoded representation of data relating to the first user;
the at least one computer processor identifying a manner in which the representation is encoded in the first sequence of values; and
the at least one computer processor providing in the second sequence of values an encoded representation of data relating to the second user, the representation of data relating to the second user being encoded in the identified manner.

3. The method of claim 2, wherein the act (B) comprises:
the at least one computer processor identifying in the first sequence of values a plurality of encoded representations of data relating to the first user;
the at least one computer processor identifying a manner in which each of the plurality of representations is encoded in the first sequence of values; and
the at least one computer processor including in the second sequence of values a plurality of encoded representations of data relating to the second user, each of the plurality of encoded representations of data relating to the second user corresponding to one of the plurality of encoded representations of data relating to the first user and being encoded in the same manner as the one encoded representation of data relating to the first user.

4. The method of claim 3, wherein the plurality of encoded representations of data relating to the first user comprises a first representation encoded in a first manner, and a second representation encoded in a second manner which is different than the first manner.

5. The method of claim 1, wherein the act (B) comprises the at least one computer processor using a pattern recognition technique to analyze the first sequence of values identified in the act (A).

6. The method of claim 5, wherein the act (B) comprises the at least one computer processor employing a plurality of pattern recognition techniques to analyze the first sequence of values, a first pattern recognition technique being employed to identify a first manner in which first data relating to the first user is encoded, and a second pattern recognition technique being employed to identify a second manner in which second data relating to the first user is encoded.

7. At least one computer-readable storage medium having instructions encoded thereon which, when executed in a computer system, cause the computer system to perform a method comprising acts of:
(A) automatically identifying a first sequence of values constituting a first code provided to a first user on a first web page being viewed by the first user, the first code being redeemable for value by only the first user, the identifying being based at least in part on an analysis of the first web page and information gathered from previous visits by one or more other users to one or more web pages on which codes were provided;
(B) dynamically reformulating at least some of the values in the first sequence of values automatically identified in the act (A) to produce a second sequence of values, different than the first sequence of value, constituting a second code redeemable for value by a second user;
(C) automatically adding the second sequence of values constituting the second code to an inventory of codes associated with the second user; and
(D) in response to the second user navigating to a second web page, automatically determining that the second web page enables redemption of the second code for value and causing the second code to be input to a field on the second web page, the second web page being accessible via the Internet, the determining being based at least in part on information gathered from previous visits by one or more other users to one or more pages on which codes were redeemed.

8. The at least one computer-readable storage medium of claim 7, wherein the act (B) comprises:
identifying in the first sequence of values an encoded representation of data relating to the first user;
identifying a manner in which the representation is encoded in the first sequence of values; and
providing in the second sequence of values an encoded representation of data relating to the second user, the representation of data relating to the second user being encoded in the identified manner.

9. The at least one computer-readable storage medium of claim 8, wherein the act (B) comprises:
identifying in the first sequence of values a plurality of encoded representations of data relating to the first user;
identifying a manner in which each of the plurality of representations is encoded in the first sequence of values; and
including in the second sequence of values a plurality of encoded representations of data relating to the second user, each of the plurality of encoded representations of data relating to the second user corresponding to one of the plurality of encoded representations of data relating to the first user and being encoded in the same manner as the one encoded representation of data relating to the first user.

10. The at least one computer-readable storage medium of claim 9, wherein the plurality of encoded representations of data relating to the first user comprises a first representation encoded in a first manner, and a second representation encoded in a second manner which is different than the first manner.

11. The at least one computer-readable storage medium of claim 7, wherein the act (B) comprises using a pattern recognition technique to analyze the first sequence of values identified in the act (A).

12. The at least one computer-readable storage medium of claim 11, wherein the act (B) comprises using a plurality of pattern recognition techniques to analyze the first sequence of values, a first pattern recognition technique being employed to identify a first manner in which first data relating to the first user is encoded, and a second pattern recognition technique being employed to identify a second manner in which second data relating to the first user is encoded.

13. A computer system, comprising:
at least one computer processor programmed to:
automatically identify a first sequence of values constituting a first code provided to a first user on a first web page being viewed by the first user, the first code being redeemable for value by only the first user, the identifying being based at least in part on an analysis of the first web page and information gathered from previous visits by one or more other users to one or more web pages on which codes were provided;
dynamically reformulate at least some of the values in the identified first sequence of values to produce a second sequence of values, different than the first sequence of values, constituting a second code redeemable for value by a second user;
automatically add the second sequence of values constituting the second code to an inventory of codes associated with the second user; and
in response to the second user navigating to a second web page, automatically determine that the second web page enables redemption of the second code for value and cause the second code to be input to a field on the second web page, the second web page being accessible via the Internet, the determining being based at least in part on information gathered from previous visits by one or more other users to one or more pages on which codes were redeemed.

14. The computer system of claim 13, wherein the at least one computer processor is programmed to:
identify, in the first sequence of values, an encoded representation of data relating to the first user;
identify a manner in which the representation is encoded in the first sequence of values; and
provide, in the second sequence of values, an encoded representation of data relating to the second user, the representation of data relating to the second user being encoded in the identified manner.

15. The computer system of claim 14, wherein the at least one computer processor is programmed to:
identify, in the first sequence of values, a plurality of encoded representations of data relating to the first user;
identify a manner in which each of the plurality of representations is encoded in the first sequence of values; and
include in the second sequence of values a plurality of encoded representations of data relating to the second user, each of the plurality of encoded representations of data relating to the second user corresponding to one of the plurality of encoded representations of data relating to the first user and being encoded in the same manner as the one encoded representation of data relating to the first user.

16. The computer system of claim 15, wherein the plurality of encoded representations of data relating to the first user comprises a first representation encoded in a first manner, and a second representation encoded in a second manner which is different than the first manner.

17. The computer system of claim 13, wherein the at least one computer processor is programmed to use a pattern recognition technique to analyze the identified first sequence of values.

18. The computer system of claim 17, wherein the at least one computer processor is programmed to employ a plurality of pattern recognition techniques to analyze the first sequence of values, a first pattern recognition technique being employed to identify a first manner in which first data relating to the first user is encoded, and a second pattern recognition technique being employed to identify a second manner in which second data relating to the first user is encoded.

* * * * *